Patented Feb. 27, 1951

2,543,399

UNITED STATES PATENT OFFICE 2,543,399

PROCESS FOR RECOVERY OF CALCIUM IN ADMIXTURE WITH SODIUM

George Calingaert, Detroit, Mich., assignor to Ethyl Corporation, New York, N. Y., a corporation of Delaware No Drawing. Application November 12, 1949, Serial No. 126,928

1 Claim. (Cl. 75—97)

This invention relates to a process for the recovery of calcium from mixtures containing calcium and sodium while simultaneously producing a higher alcohol from a lower alcohol. More particularly my invention is directed toward the recovery of the calcium contained in sludges formed in electrolytic processes for the manufacture of sodium from a mixture of sodium and calcium chlorides In the production of sodium by electrolysis of fused sodium chloride, calcium chloride is added to the electrolyte in order to lower its melting point. During the electrolysis calcium metal, as well as sodium, is produced at the cathode, and at the temperature of operation dissolves in the sodium melt. When this solution is removed from the cell it is cooled and most of the calcium crystallizes out. This crude sodium mixture containing the calcium metal is purified, usually by mechanical separation, and most of the sodium recovered therefrom. The residue or sludge obtained from such separation consists of a mixture of solids containing crystals of calcium embedded in a matrix of sodium and also contains impurities such as sodium and calcium oxides and chlorides. The total amount of metals in the residue varies but in general it is from 70 to 90 per cent. The amount of calcium contained therein is generally between 15 and 30 per cent.

Certain workers in this field have attempted to recover some of the sodium component from this sludge. However, this is impractical and commercial practice has been to dispose of this sludge by any safe means. One such means is to return the sludge to the electrolytic cells, but this procedure is uneconomical and hazardous. Also such residues can be disposed of by burning or by chemical means. These methods however, destroy the metal components since the resulting mixture of oxides and salts has no commercial value and must be wasted. None of the disposal methods are economical and all are hazardous due to the danger of fire and explosion if the sludge is contacted with water. Processes that have recovered sodium have not paid for the cost of the processing and were used primarily as a preferred means of disposal. The calcium values as well as the sodium values contained in such sludges are important. Further, heretofore chemical processes for separating calcium from sodium has not resulted in by-products sufficiently valuable to make the separation process attractive. The higher alcohol by-product of my process are valuable in the manufacture of detergents, plasticizers, synthetic lubricating oils and as chemical intermediates.

It is an object of this invention to provide a process for economically recovering calcium from admixture with sodium. A more specific object is to recover calcium substantially free of sodium metal from a sludge material containing sodium and calcium while simultaneously producing a higher alcohol from a lower alcohol.

I accomplish these objects by treating a mixture of calcium and sodium with a lower alcohol and an ester of a fatty acid corresponding to the desired higher alcohol, preferably under anhydrous conditions and preferably in the presence of an inert organic solvent. Under these conditions, the calcium is not acted upon, while the alcohol reacts simultaneously with the sodium and with the ester to yield on the one hand sodium alcoholate and on the other a mixture of the alcohol present in the ester and that obtained by reduction of the fatty acid. The calcium freed by this process is recovered, washed and dried and from the remaining liquor the higher alcohol is recovered.

My invention is best understood by referring to the following working example in which the parts and percentages are by weight, unless otherwise specified.

To a reaction vessel equipped with suitable stirring means is added 660 parts of xylene, 149 parts of methyl stearate and 50 parts of sodium-calcium pellets formed from the sludge obtained in the electrolytic production of sodium from a mixture of sodium and calcium chlorides. The reaction mixture is heated to the reflux temperature of the inert organic solvent, i. e. xylene, while stirring vigorously, thereby fusing and dispersing the sludge. The mixture in the vessel is then cooled to 70° while stirring is continued, and the reduction reaction is started by feeding to the vessel at the rate of about one part per minute a total of 74 parts of tertiary-butyl alcohol. The addition of tertiary-butyl alcohol is completed in about 85 minutes, the exact time depending upon the heat of reaction which controls the rate of addition. After addition is complete the reaction mixture is stirred for a further 15 minutes and then poured into chilled anhydrous denatured ethyl alcohol. The unreacted of freed calcium is separated from the mother liquor and washed by a series of decantations with alcohol, finally washed with hexane and dried with a stream of nitrogen. All the above reactants are substantially anhydrous and anhydrous conditions are maintained throughout the reaction since the presence of even small quantities of water is detrimental to the reaction.

The thus produced higher alcohol is recovered as follows: the combined mother liquor containing the higher alcohol is flash-distilled by addition to a vessel containing boiling water. The resulting mixture is then further steam-distilled until all the inert organic solvent, i. e. xylene, the lower alcohols, i. e. methyl, ethyl and tertiary-butyl alcohol, have been distilled. The gelatinous distillation residue is neutralized with dilute sulfuric acid and treated with hot water. The oil phase, containing the higher alcohol, is then extracted from the cooled mixture with ethyl ether. The combined ether extracts are washed in turn with a small amount of water, sodium carbonate solution and again with water before being dried over anhydrous magnesium sulfate. The ether is evaporated and the higher alcohol recovered in a high state of purity by distillation under reduced pressure.

From the above example 6 parts of calcium of high purity and 43 per cent of stearyl alcohol was obtained. In a similar example using cocoanut oil in place of methyl stearate over 42 per cent of cocoanut oil fatty alcohols was obtained.

My invention is not limited to the specific example given above. Good results are obtained when other esters of fatty acids are substituted for methyl stearate. Thus, the naturally occurring glycerides of the fatty acids, such as those present in vegetable oils such as cocoanut, palm and palm kernel oil and the animal fats and marine oils can be reduced by my process to the corresponding alcohols. Likewise instead of tertiary-butyl alcohol other lower alcohols readily supply the reducing material from which the higher alcohol is made, including ethyl alcohol, propyl alcohol, the various amyl alcohols and the like. Further, other inert organic solvents other than xylene may be used such as toluene and benzene. The use of inert organic solvents while not essential to my invention is preferred because better results are obtained by such use, particularly better control of the reaction. While my process in general may be employed for the reduction of fatty acid esters to the corresponding alcohol, it finds its widest application in reduction of naturally occurring fatty acid esters and glycerides of high molecular weight. In particular my invention possesses great utility in the reduction of glycerides of unsaturated fatty acids, for from such compounds are prepared alcohols retaining the unsaturated olefin linkage, whereas by some other methods of reduction the carbon chain is saturated as readily as the carboxylic ester linkage.

The temperature employed in my process while not critical is important. The operating temperature is varied according to the ester and/or organic solvent employed and the residence time of the calcium in the reaction medium. In general the temperature should not be higher than the boiling point of the reaction mixture and preferably the temperature should be as close to the reflux temperature as possible without seriously reducing the yields of calcium obtainable. In general the temperature should be between 50 and 100° C. The residence time which is the time of contact of the calcium with the reaction mixture should be between 30 minutes and 8 hours depending upon the reactants used and temperature employed.

I claim:

A process of recovering calcium from electrolytic sludges in which it occurs in admixture with sodium, which comprises treating said sludge under anhydrous conditions with a lower aliphatic alcohol in the presence of an ester of a higher fatty acid for a sufficient period of time to permit substantially all of the sodium to react with said alcohol and for the hydrogen thereby produced to react with said ester, then separating calcium from the resulting solution before any substantial amount thereof has reacted therewith.

GEORGE CALINGAERT.

REFERENCES CITED

The following references are of record in the file of this patent:

UNITED STATES PATENTS

| Number | Name | Date |
|---|---|---|
| 2,019,022 | Scott et al. | Oct. 29, 1935 |
| 2,070,597 | Henke et al. | Feb. 16, 1937 |

OTHER REFERENCES

"Handbook of Chemistry and Physics," 27th ed., published by the Chemical Rubber Publishing Co., 1943, pages 358, 359, 454, and 455.